DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED DECEMBER 2, 1975

941 O.G. 5

T941,001

COATING COMPOSITIONS

Charles Lee Corpening, Rte. 16, 5912 Sue St. 37663, and Theron Edward Parsons III, 4145 Skyland Drive 37664, both of Kingsport, Tenn.

Filed June 17, 1974, Ser. No. 480,444

Int. Cl. C08b *21/32*

U.S. Cl. 260—17 R

No Drawing. 6 Pages Specification

Nonaqueous dispersions of acrylic thermosetting resins are modified with a compatible cellulose acetate butyrate to provide coating compositions having improved flow out and pigment control. The cellulose acetate butyrate has a butyryl content of from about 35 to 55% by weight, a hydroxyl content of from about 0.2 to about 5% by weight, an acetyl content of less than 3% and a viscosity of from about 0.001 to about 0.015 seconds. The cellulose acetate butyrate is dissolved in a solvent and mixed with the nonaqueous dispersion so that the cellulose acetate butyrate is present in an amount of from about 0.1 to about 20% by weight, based on the weight of the solids in the nonaqueous dispersion.